United States Patent [19]
Esterowtiz et al.

[11] Patent Number: 5,459,745
[45] Date of Patent: Oct. 17, 1995

[54] TM:YALO, 1.94-MICRON, SOLID STATE LASER

[75] Inventors: Leon Esterowtiz, Springfield; Robert C. Stoneman, Alexandria, both of Va.

[73] Assignee: The United States of America as represented by the Secretary of the Navy, Washington, D.C.

[21] Appl. No.: 53,280

[22] Filed: Apr. 28, 1993

[51] Int. Cl.$^6$ ........................................... H01S 3/16
[52] U.S. Cl. ................... 372/41; 372/18; 372/20
[58] Field of Search .................... 372/41, 18, 20, 372/71

[56] References Cited

U.S. PATENT DOCUMENTS

| | | | |
|---|---|---|---|
| 4,701,928 | 10/1987 | Fan et al. | 372/71 |
| 4,965,803 | 10/1990 | Esterowtiz et al. | 372/5 |
| 4,967,416 | 10/1990 | Esterowitz et al. | 372/6 |
| 4,969,150 | 11/1990 | Esterowitz et al. | 372/41 |
| 5,003,547 | 3/1991 | Esterowitz et al. | 372/19 |
| 5,107,509 | 4/1992 | Esterowitz et al. | 372/20 |
| 5,206,867 | 4/1993 | Esterowitz et al. | 372/20 |

*Primary Examiner*—Rodney B. Bovernick
*Assistant Examiner*—Robert E. Wise
*Attorney, Agent, or Firm*—Thomas E. McDonnell; Jameson: George

[57] ABSTRACT

A thulium-doped solid state laser is provided capable of operation at a wavelength having a shallow absorption depth in tissue. The laser is comprised of a laser cavity defined by first and second reflecting surfaces opposing each other on an optical axis, a thulium-doped YALO crystal disposed in the cavity, and a pump source for pumping the crystal with a pump beam at a preselected wavelength to enable the crystal to emit a most preferred 1.94 micron laser output. The thulium-doped YALO crystal is preferably an a-cut crystal. Such alignment of this material provides a reliable mode at 1.94 microns which has excellent tissue absorption characteristics for medical applications. The length l of the crystal, the concentration N of the dopant and the transmissivity T of the output coupler, which define an expression Nl/T, can be varied as long as the expression Nl/T produces a value which does not exceed about 0.32 centimeters.

11 Claims, 3 Drawing Sheets

TM:YALO, 1.94-MICRON, SOLID STATE LASER

BACKGROUND OF THE INVENTION

1. Field of the Invention

The present invention relates to lasers and, more particularly, to a laser-pumped, thulium-doped YALO solid state laser capable of producing a desired wavelength having a shallow absorption depth in human and animal tissue without the use of a tuning element.

2. Description of the Related Art

Solid-state lasers doped with thulium ($Tm^{3+}$) have demonstrated tunability over a range of wavelengths as disclosed, for example, in U.S. Pat. No. 4,969,150 which is incorporated herein by reference. These lasers are useful for medical applications because they can be tuned to wavelengths where tissue (which is predominantly water) has a shallow absorption depth. FIG. 1 illustrates a curve plotting absorption depth in water for various wavelengths of light. For medical applications, the most shallow absorption depth is preferred. Holmium:YAG (Ho:YAG) and thulium:YAG (Tm:YAG) lasers are currently used for medical applications. A new type of laser capable of reliably operating at a wavelength having a shallow absorption depth is desired.

SUMMARY OF THE INVENTION

An object of the present invention is to provide a laser material having an output exhibiting a shallow absorption depth in water.

Another object of the present invention is to provide a laser capable of reliably operating at a particular wavelength having a shallow absorption depth in water.

Another object of the present invention is provide a laser which operates at a wavelength having a shallow absorption depth in water without the need for a tuning element.

Another object of the present invention is to provide a laser constructed to operate at a fixed wavelength of about 1.94 microns.

A further object of the present invention is to provide a Tm:YALO laser to operate at a fixed wavelength of about 1.94 microns without a tuning element.

These and other objects and features of the present invention are achieved by providing a thulium-doped solid state laser made preferably of a yttrium ortho aluminate ($YAlO_3$ or YALO) crystal. A thulium-doped YALO ($Tm^{3+}$:YALO or Tm:YALO) crystal has a most preferred mode of operation at about 1.94 microns when the crystal is a-cut (so that the a-axis of the crystal is positioned along the optical axis of the laser). A preferred mode of operation occurs when this type of crystal is c-cut (so that the c-axis of the crystal is positioned along the optical axis of the laser). The concentration of dopant, length of the crystal and the transmissivity of an output reflector define a relationship which, when satisfied, produces a reliable laser output at a wavelength which produces a shallow absorption depth in water.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENTS

Figure 1:
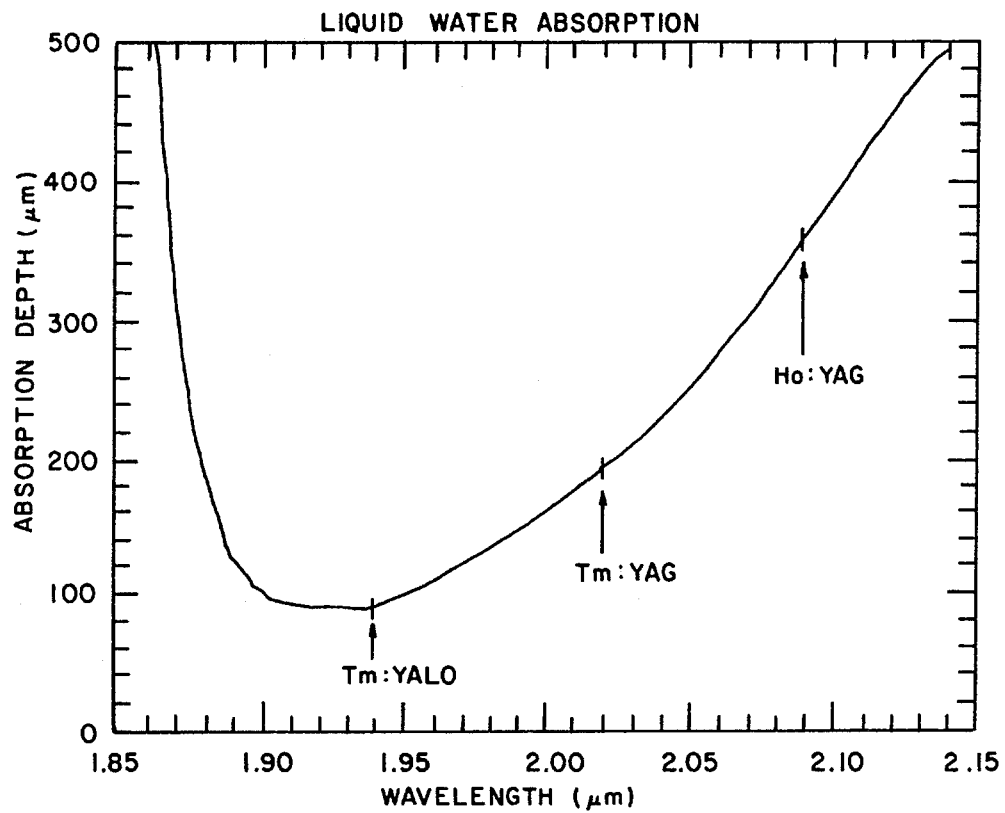
FIG. 1 illustrates a plot of light absorption depth in liquid water for various wavelengths of light.
Figure 2:
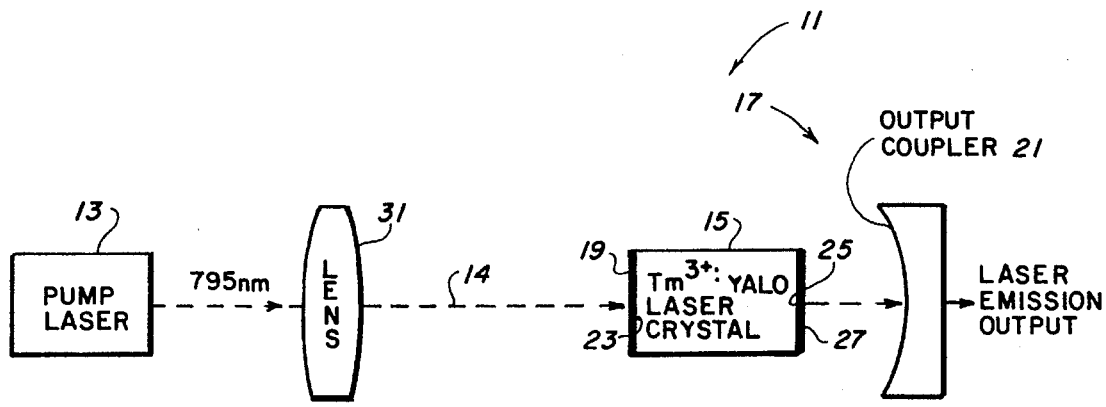
FIG. 2 illustrates a preferred embodiment of the invention.

Referring now to the drawings, FIG. 2 illustrates a preferred embodiment of the present invention in which a room-temperature, thulium-doped ($Tm^{3+}$-doped), YALO solid state laser is pumped by a laser beam from a pump laser 13 at about 795 nanometer (nm), to produce a laser emission at a wavelength of about 1.94 microns. Such a thulium-doped YALO laser has a shallow absorption depth in liquid water, as shown in FIG. 1.

The YALO oxide host has significant thermal-mechanical advantages over fluoride hosts such as $LiYF_4$ (YLF) in terms of damage resistance and long term laser performance reliability. In addition, the YALO host, when doped with trivalent thulium, has a much longer wavelength pump band compared to YLF. This longer pump wavelength (of approximately 795 nm) has superior properties than the shorter pump wavelength (of approximately 780 nm for YLF) with respect to average power, cost, lifetime, fiber-coupled output and availability.

Pump laser 13 which emits the laser beam at about 795 nm to pump the laser 11, is preferably a quasi-CW, or pulsed GaAlAs laser diode array or a GaAlAs laser diode. However, the pump laser 13 can also be a titanium sapphire laser which can also produce a CW or pulsed pump beam. It should be noted at this time that the pump wavelength of about 795 nm was chosen because 795 nm is within the absorption peak of the thulium in the solid state laser 11 as will later be discussed with respect to FIG. 3 below. Any pump source having a wavelength of about 793 nm to about 796 nm is preferred. Also, end pumping using a laser diode pump source has been found to produce best results. Flashlamp pumping has not been found to produce efficient lasing at the desirable lasing wavelengths having low water absorption in part because the pumping light is broadband.

The solid state laser 11 is comprised of a laser rod or crystal 15 disposed in a laser cavity 17 defined by optically-aligned, input and output reflective elements or mirrors 19 and 21. Reflective elements 19 and 21 oppose each other along an optical axis 14 to form a reflective path therebetween. The mirrors 19 and 21 can be separate elements or can be polished or mirrored end surfaces of the crystal 15.

The laser crystal 15, which can have a length between 0.025 cm and 2.5 cm (centimeters), has an exemplary length in this description of approximately 0.2 cm and also has flat and parallel surfaces 23 and 25. The input surface 23 of the laser crystal 15 has a dichroic coating which operates as the input reflective element or mirror 19. However, it should be understood that the mirror 19 could be a separate mirror spaced apart from the laser crystal 15. The dichroic coating or mirror 19 has a high transmission (about 90%) at the pump wavelength of about 795 nm and a high reflection (greater than 99%) at a wavelength of about 1.94 microns. The second surface 25 of the laser crystal 15 has an anti-reflection coating 27 at a wavelength of about 1.94 microns.

The output reflective element or output coupler 21, which defines the output end of the laser cavity 17, is concave and has an exemplary 5 centimeter (cm) radius of curvature. This reflective element 21 has a transmissivity of about 2.5% to about 5% at a wavelength of about 1.94 microns. However, the transmissivity can vary from about 2% to about 10% or even from about 1.5% to 20%. Consequently, reflective element 21 operates as an output coupler to output a portion of the laser emission developed by the laser crystal 15 when it is pumped by the 795 nm laser emission from the pump laser 13. The reflective element or output coupler 21 can be selected from a variety of different output couplers, with a radius of curvature ranging from 5 cm to 20 cm.

The laser crystal or rod 15 has been found to exhibit very reliable lasing at about 1.94 microns using a thulium-doped YALO crystal.

Figure 3:
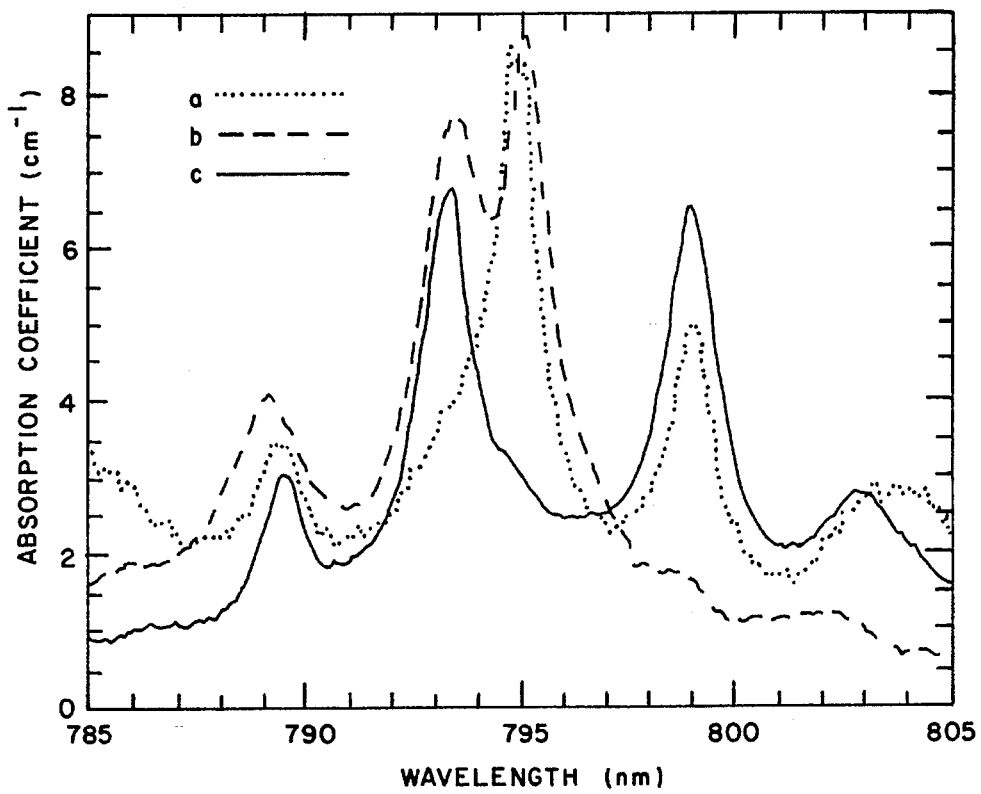
FIG. 3 illustrates a plot of light absorption in a YALO crystal for various wavelengths.

FIG. 3 illustrates the absorption coefficient of a thulium-doped YALO crystal as a function of wavelength at room temperature. The three curves designated as a, b and c illustrate the absorption in a thulium-doped YALO crystal for light polarized along the mutually orthogonal a, b and c axes, respectively. The light may be polarized along either of the two directions orthogonal to the crystal-cut axis. For example, an a-cut crystal can absorb light polarized along either the b or the c axis.

As can be seen in FIG. 3, the crystal has good absorption in the range from 793 nm to 796 nm and at about 799 nm. Thus, pump source wavelengths in the range 793 nm to 796 nm and at about 799 nm are desirable. Generally, the broader the absorption line, the more desirable the wavelength. Because the wavelength characteristic of a diode laser pump varies with respect to temperature, a broad absorption line is desired to insure sufficient absorption of the pump light. Thus, the broader the absorption line, the less necessary is control of the diode laser temperature.

Figure 4:
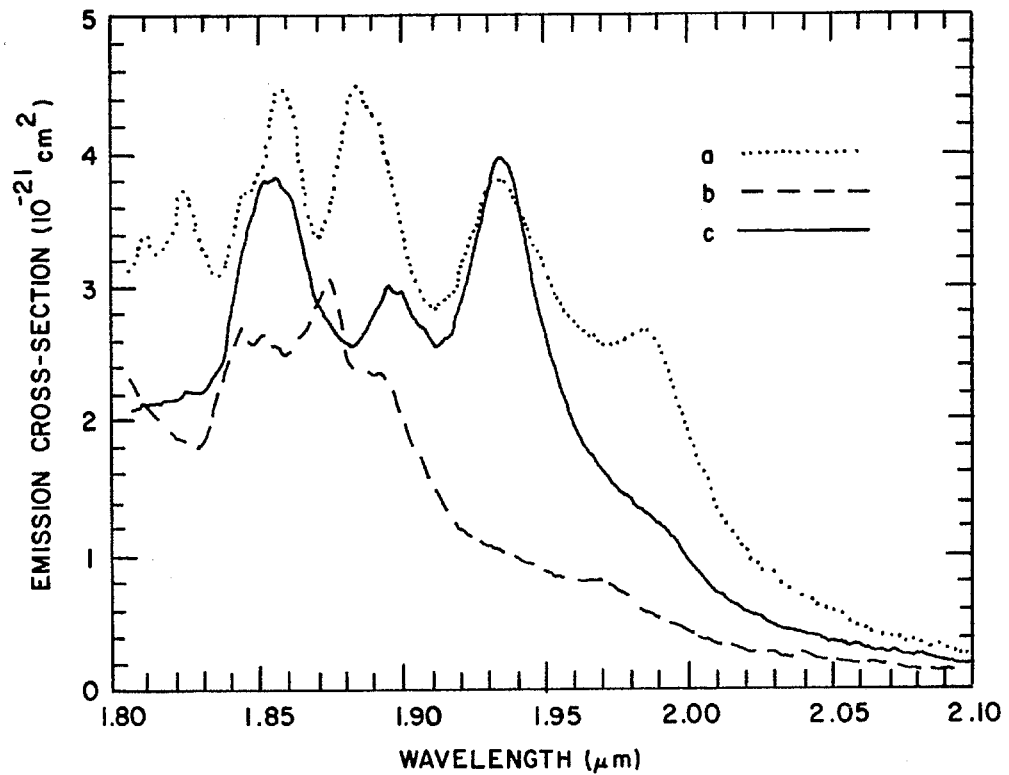
FIG. 4 illustrates a plot of the emission cross section for a Tm:YALO crystal for various wavelengths.

FIG. 4 illustrates the emission cross-section of the laser material with respect to the wavelength of lasing. Three curves are illustrated for laser emission polarized along each of the a, b and c axes of the crystal. The laser can operate with an emission polarized along either of the two directions orthogonal to the crystal-cut axis. For example, an a-cut crystal can have laser emission polarized along either the b axis or the c axis. Thus, for an a-cut crystal the laser emission can follow either of the curves designated as b or c in FIG. 4. Of these two polarizations, the laser emission will be polarized along the one having the higher emission cross-section. For an a-cut crystal the c-axis polarization has the higher cross section peak, at 1.94 microns. Then, the mode of operation will occur at about the 1.94 micron wavelength which corresponds to the peak of the solid curve at 1.94. Alternatively, a c-cut crystal can be used. If a c-cut crystal is used, the laser emission can have polarization along either the a or b axis, and lasing will occur either at about 1.94 microns or about 1.99 microns which correspond, respectively, to the peaks of the dotted-line curve at 1.94 or 1.99. Because the laser will have a tendency to move up to the higher wavelength at 1.99 in the c-cut crystal, the a-cut crystal is preferred because the 1.94 micron wavelength has the most shallow absorption depth in liquid water.

The laser rod or crystal 15 is thus preferably an a-cut crystal and, alternatively, the crystal 15 could be a c-cut crystal.

Figure 5:
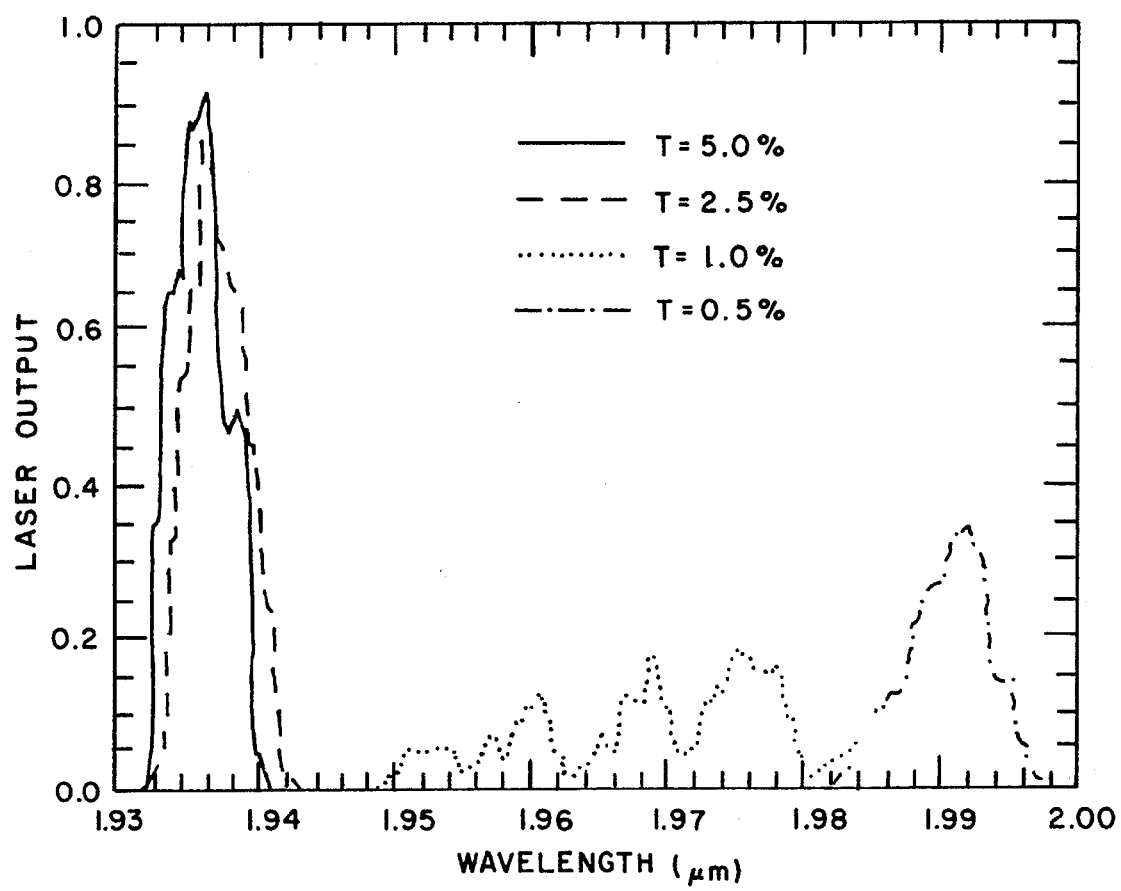
FIG. 5 illustrates a plot of laser output power for various wavelengths of a Tm:YALO crystal at four exemplary values of output transmission T.

FIG. 5 illustrates the output power as a function of wavelength for certain transmissivities of the output coupler 21. As can be seen from FIG. 5, it is preferred that the transmissivity is above at least 1.0 percent to locate the laser output in the vicinity of 1.94 microns. Thus, although transmissivities of 1.5% to 20% are possible, the transmissivities can vary from about 2% to about 10% or preferably vary from only about 2.5% to about 5%.

In the preferred embodiment of the present invention, the YALO oxide host laser crystal 15 is doped with thulium to a concentration N of about 4%. However, the concentration of thulium can range from about 2% to about 8% or even from about 2% to about 15%. In this preferred embodiment, the crystal 15 also has a length l of about 0.2% centimeters. Further, as assessed above, in this preferred embodiment, the output coupler 21 has a transmissivity T of from about 2.5% to about 5% at a wavelength of about 1.94 microns.

The values of the dopant concentration N, crystal length l and output transmissivity T can vary proportionately to one another so long as the following expression falls at or below a certain value.

$$Nl/T$$

This expression preferably should be less than or equal to about 0.2 centimeters for the laser to reliably operate at the desired wavelength of, for example, in the preferred embodiment, 1.94 microns. Any combination of output transmissivity T, crystal length l and dopant concentration N is possible so long as this expression yields a value of less than or equal to about 0.32 centimeters. The larger the product Nl, the higher the sensitivity to reabsorption losses.

It should again be emphasized that the YALO oxide host has significant thermal-mechanical advantages over fluoride hosts such as $LiYF_4$ (YLF) in terms of damage resistance and long term laser performance reliability. In addition, the YALO host, when doped with trivalent thulium, has a much longer wavelength pump band compared to YLF. This longer pump wavelength (of approximately 795 nm) has superior properties than the shorter pump wavelength (of approximately 780 nm for YLF) with respect to average power, cost, lifetime, fiber-coupled output and availability.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A laser comprising:

a laser cavity defined by first and second reflective surfaces opposing each other along an optical axis, said second reflective surface having a transmissivity selected at about 1.94 microns;

a thulium-doped YALO crystal disposed within said cavity and having a length l and concentration N of thulium sufficient to lase at a desired wavelength within the range from about 1.89 microns to about 1.99 microns when said crystal is pumped by a pump beam at a preselected wavelength, said crystal is an a-cut crystal with the a-axis of said crystal positioned along the optical axis; and a pump source for end pumping said crystal at said preselected wavelength.

2. The laser of claim 1 wherein:

the length l and the concentration N of said crystal and the transmissivity T of said second reflective surface are selected to define an expression (Nl)/T which has a value that does not exceed about 0.32 centimeters.

3. A laser comprising:

a laser cavity defined by first and second reflective surfaces opposing each other along an optical axis, said second reflective surface having a transmissivity;

a thulium-doped YALO crystal disposed within said cavity and having a length l and concentration N of thulium sufficient to lase at a desired wavelength within the range from about 1.89 microns to about 1.99 microns when said crystal is pumped by a pump beam at a preselected wavelength, said crystal is an a-cut crystal with the a-axis of said crystal positioned along the optical axis; and a pump source for end pumping said crystal at said preselected wavelength.

4. The laser of claim 3 wherein:

the length l and the concentration N of thulium in said crystal and the transmissivity T of said second reflective surface are selected to define an expression (Nl)/T which has a value that does not exceed about 0.32 centimeters.

5. A laser comprising:

a laser cavity defined by first and second reflective surfaces opposing each other along an optical axis, said second reflective surface having a transmissivity selected at about 1.94 microns;

a thulium-doped YALO crystal disposed within said cavity and having a length l and concentration N of thulium sufficient to lase at a desired wavelength within the range from about 1.89 microns to about 1.99 microns when said crystal is pumped by a pump beam at a preselected wavelength, the length l and the concentration N of thulium in said crystal and the transmissivity T of said second reflective surface are selected to define an expression (Nl)/T which has a value that does not exceed about 0.32 centimeters, and a pump source for end pumping said crystal at said preselected wavelength.

6. The laser of claim 5 wherein:

said pump source comprises a laser diode for emitting said pump beam at a preselected wavelength selected from the group consisting of a wavelength of about 799 nm and wavelengths within the range from about 793 nm to about 796 nm.

7. The laser of claim 6 wherein:

said laser diode is preferably a GaAlAs laser diode for emitting said pump beam at about 795 nm and arranged to pump said crystal along the optical axis.

8. A laser comprising:

a laser cavity defined by first and second reflective surfaces opposing each other along an optical axis, said second reflective surface having a transmissivity;

a thulium-doped YALO crystal disposed within said cavity and having a length l and concentration of thulium sufficient to lase at a desired wavelength within the range from about 1.89 microns to about 1.99 microns when said crystal is pumped by a pump beam at a preselected wavelength; and a pump source for end pumping said crystal at said preselected wavelength, said pump source comprising a laser diode for emitting said pump beam at a preselected wavelength selected from the group consisting of a wavelength of about 799 nm and wavelengths within the range from about 793 nm to about 796 nm.

9. The laser of claim 8 wherein:

said laser diode is preferably a GaAlAs laser diode for emitting said pump beam at a wavelength of about 795 nm and arranged to pump said crystal along the optical axis.

10. A laser comprising:

a laser cavity defined by first and second reflective surfaces opposing each other along an optical axis, said second reflective surface having a transmissivity T;

a thulium-doped YALO crystal disposed within said cavity and having a length l and concentration N of thulium selected to define an expression (Nl)/T which has a value that does not exceed about 0.32 centimeters; and a pump source arranged to end pump said crystal with a laser emission to cause said crystal to develop a laser output at a desired wavelength.

11. The laser of claim 10 wherein:

said laser diode produces a pump beam at a preselected wavelength selected from the group consisting of a wavelength of about 799 nm and wavelengths within the range from about 793 nm to about 796 nm.

* * * * *